3,822,253
Patented July 2, 1974

1

2,822,253
PROCESS FOR THE PREPARATION OF Δ⁴-3,20-DIKETO - 6,6-DIFLUORO-11β,16α,17α,21-TETRA-HYDROXYPREGNENE 16,17-KETALS
William Charles Ripka, Wilmington, Del., assignor to E. I. du Pont de Nemours and Company, Wilmington, Del.
No Drawing. Continuation-in-part of application Ser. No. 31,001, Apr. 22, 1970. This application Jan. 11, 1971, Ser. No. 105,666
Int. Cl. C07c 173/00
U.S. Cl. 260—239.55 D
10 Claims

ABSTRACT OF THE DISCLOSURE

A Δ⁴-3,2-diketo-6,6-difluoro - 11β,16α,17α,21 - tetrahydroxypregnene 16,17-ketal is prepared by a process involving the addition of NOF or a mixture of NOF with NOBF₄ to the appropriate Δ⁵-pregnane 16,17-ketal in which the 3- and 21-hydroxyls are protected by acylation; hydrolysis of the resulting 5α-fluoro-6-nitriminosteroid to the 5α-fluoro-6-ketosteroid; fluorination of the C–6 position with SF₄; hydrolysis of the 3- and 21-acyloxy groups; selective acetylation of the 21-hydroxyl; oxidation of the 3-hydroxyl to the 3-ketone; dehydrofluorination in the C–4 to C–5 positions; and microbiological hydroxylation at C–11. Steroids of the above reaction sequence are useful anti-inflammatory and glucocortical agents, and particularly those obtained by dehydration at the C–9 and C–10 positions followed by preparation of 9α-bromo-11-hydroxy, conversion of the latter to 9,11-oxo and this to 9α-fluoro-11β-hydroxy. The latter can further be oxidized to produce a double bond in the 1,2-position.

CROSS-REFERENCE TO RELATED APPLICATION

This application is a continuation-in-part of my co-pending application Ser. No. 31,001, filed Apr. 22, 1970.

BACKGROUND OF THE INVENTION

Field of the Invention

This invention relates to a process for the preparation of certain Δ⁴-3,20-diketo-6,6-difluoro-11β,16α,17α,21-tetrahydroxypregnene 16,17-ketals which are useful as anti-inflammatory and glucocortical agents. These compounds are suitable for the treatment of allergic diseases, collagen diseases, skin diseases, and the like.

Prior Art

A recent patent, U.S. 3,219,673 (to Boswell), describes a process for the preparation of 6,6-difluoro-3-keto-Δ⁴-steroids, wherein a 3-acyloxy-5-fluoro-6-ketosteroid is treated with sulfur tetrafluoride; the 3-acyl group is hydrolyzed; the resulting 3-hydroxyl is oxidized to the 3-keto group; and the Δ⁴-double bond is introduced by dehydrofluorination with a weak base. This process is illustrated in Example 3 by the preparation of 6,6-difluoro-4-pregnene-3,20-dione. None of the compounds disclosed in the Boswell patent has either a 16- or a 21-hydroxyl; nor does any steroid disclosed there have any 16,17-ketal group. It is known that ketals are very acid-sensitive, and it would appear, therefore, that a method similar to that disclosed by Boswell in his patent would not be applicable to steroids having a 16,17-ketal group.

Some Δ⁴-3-keto-6,6-difluoropregnenes have been prepared by treating a Δ³,Δ⁵-3-alkoxy-6-fluoropregnadiene with perchloryl fluoride in an aqueous tetrahydrofuran/pyridine solvent. This process suffers from the disadvantage that it results in extremely low yields of the desired 6,6-difluoropregnene in a difficulty separable mixture, and that it uses perchloryl fluoride, which is an expensive and potentially dangerous reagent.

Yet, certain steroids having the 16,17-ketal group are important biologically active agents. There is a need, therefore, for a simple, reliable and inexpensive process for the production of Δ⁴-3,20-diketo-6,6-difluoro-11β,16α, 17α,21-tetrahydroxypregnene 16,17-ketals.

SUMMARY OF THE INVENTION

According to this invention, it has now been discovered that the sequence of reactions described in the above-cited Boswell Pat. 3,219,673 can be substantially applied to steroid 16,17-ketals without decomposition of these acid-sensitive groups. It also has been found that the first step of this sequence, the reaction with NOF, can be considerably improved by using a mixture of NOF with NOBF₄. This process can be illustrated by the following Scheme 1 wherein the compound from Step 8 is an active glucocorticoid and can be used in the remaining steps to provide more active compounds.

Scheme 1

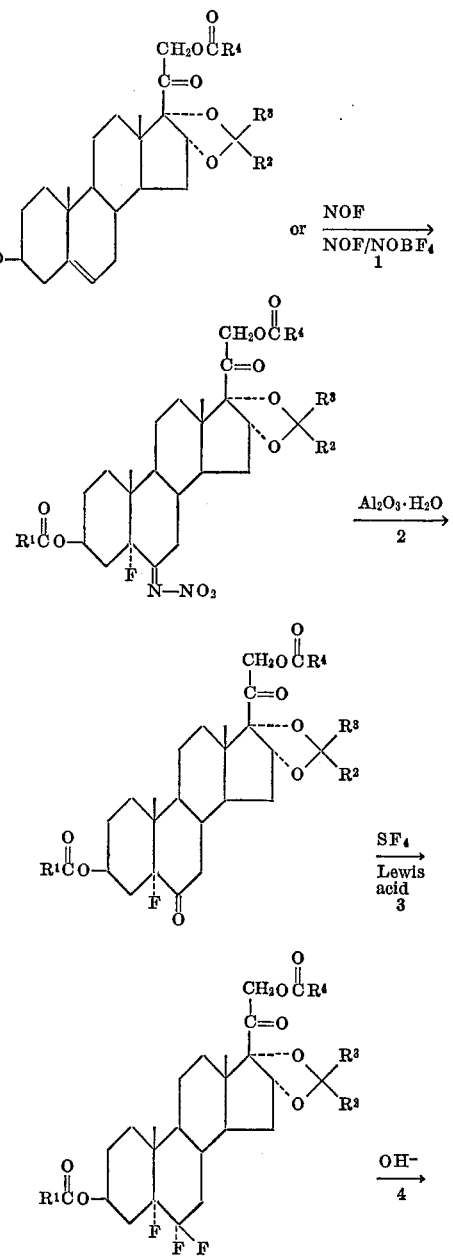

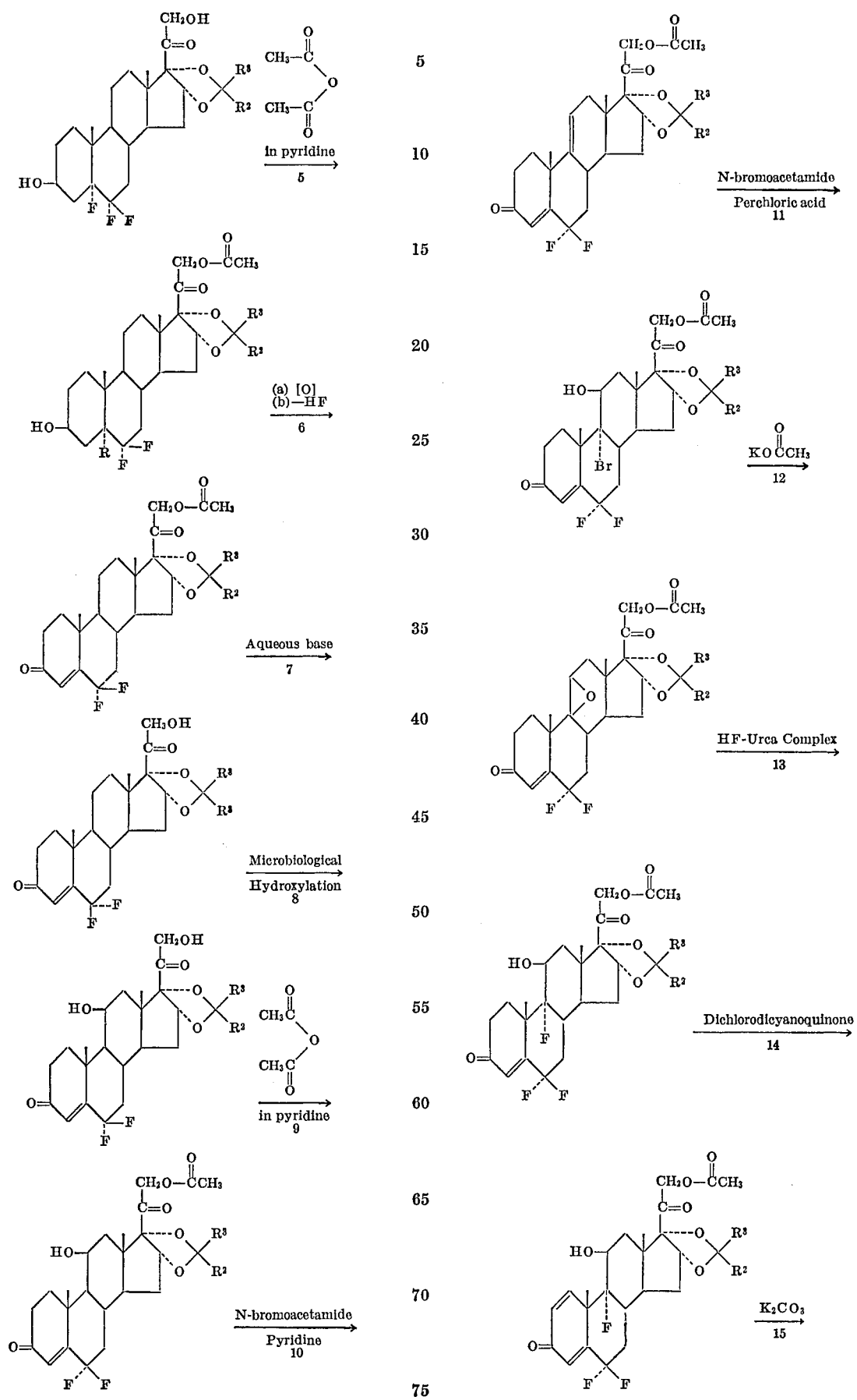

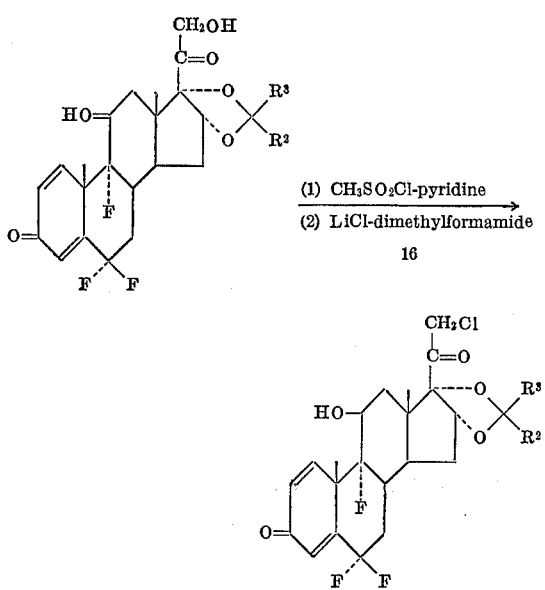

The reference characters used in the above Scheme have the following meaning:

$R^1$ and $R^4$ each individually is a $C_1$–$C_5$ alkyl;
$R^2$ and $R^3$ each individually is a $C_1$–$C_6$ alkyl, a $C_5$–$C_6$ cycloalkyl; or phenyl; but $R^2$ and $R^3$ together can be tetramethylene or pentamethylene.

The methyl groups in C-10 and C-13 positions are indicated by vertical lines.

Several novel intermediates, obtained in various stages of this process are biologically active and are of considerable interest in their own right.

DETAILED DESCRIPTION OF THE INVENTION

The starting materials used in the process of this invention can be made by known methods from readily available materials. For example, $3\beta,16\alpha,17\alpha,21$-tetrahydroxy-5-pregnen-20-one 16,17-acetonide, which can be obtained by the procedure of Crabbe et al. in Bull. Societes Chimiques Belges, 70, 271–284 (1961), can be acetylated in C-3 and C-21 positions to the starting material of Scheme 1 in which $R^1$, $R^2$, $R^3$, and $R^4$ each is methyl.

Although the acyl groups at C-3 and C-21 can be any conventional, hydrolyzable alkanoyl groups, it is more convenient to have lower alkanoyl groups in those positions because they can be readily removed without recourse to drastic conditions. $R^1$ and $R^4$ can thus be, for example, methyl, ethyl, 1-propyl, 2-propyl, 1-butyl, 2-butyl, sec-butyl, t-butyl, pentyl, (all isomers), and hexyl (all isomers).

$R^2$ and $R^3$ of the ketal grouping usually are methyl groups but can also be individually such other groups as, for example, ethyl, propyl, isopropyl, butyl, isobutyl, pentyl, hexyl, cyclopentyl or cyclohexyl and can together form the tetramethylene or pentamethylene radical. The desired ketal is prepared from the appropriate ketone and the $16\alpha,17\alpha$-dihydroxy steroid in the presence of an acid catalyst.

The first step of the instant process, the reaction of a 3-alkanoyl - $\Delta^5$ - pregnene 16,17-ketal with nitrosyl fluoride or with a mixture of nitrosyl fluoride with nitrosyl tetrafluoroborate is carried out in an inert sovlent; for instance, a halogenated hydrocarbon, such as methylene chloride, chloroform, carbon tetrachloride, fluorodichlormethane, and ethylene chloride, or mixtures of these with glyme, acetonitrile, and sulfolane. Nitrosyl tetrafluoroborate can be added with nitrosyl fluoride in this step. A mixture of these two materials is much more efficient than nitrosyl fluoride alone. Higher yields of 5-fluoro-6-nitriminopregnane ketals are obtained in this manner. Nitrosyl tetrafluoroborate, which is a crystalline solid, can also be made in situ by using a mixture of nitrosyl fluoride and of boron trifluoride. The molar ratio of nitrosyl fluoride to nitrosyl tetrafluoroborate in the mixture can be varied within rather broad limits, e.g., 50:1 to 1:50. Usually, the optimum ratio is 1:1.

The amount of nitrosyl fluoride employed must, of course, be at least stoichiometric, i.e., two moles per mole of the starting $\Delta^5$-pregnene. However, it is advantageous to use an excess of nitrosyl fluoride. An initial molar ratio of nitrosyl fluoride to the $\Delta^5$-pregnene ketal of about 3 to 1 has been found to be particularly practical, high yields of the 5-fluoro-6-nitriminopregnane being obtained in short times.

The reaction is carried out at moderate temperatures, preferably no higher than about 100° C. and especially within the range of about $-10°$ to 30° C. Within this range, the reaction rates are satisfactory and can be easily controlled. Atmospheric pressure is sufficient, although higher pressures may sometimes be required to maintain a sufficient concentration of the reactants at the reaction temperatures. Moisture is undesirable in this step because of the danger of NOF and/or $NOBF_4$ hydrolysis.

The nitrosyl fluoride adduct obtained in the first step, the 5-fluoro-6-nitriminopregnane, can be isolated in any conventional manner, such as for example evaporation of the solvent and recrystallization of the residue. In practice, this isolation and purification step is not required, and the crude solution can be directly subjected to the next step, i.e. conversion of the nitrimino group to the keto group.

The solution is first contacted with a weak base, such as an aqueous alkali bicarbonate, to remove excess NOF and/or $NOBF_4$ and acidic reaction side products. The solution is then chromatographed on neutral alumina containing 5–15% by weight of water (activity grade III). The 5-fluoro-6-keto-pregnane ketal formed in this step is eluted with a suitable solvent or a solvent combination, such as aliphatic or aromatic hydrocarbons. Instead of the chromatographic technique, any other suitable technique for contacting the fluoronitriminopregnane with wet alumina can be used; for example, vigorously stirring a suspension of alumina in the fluoronitriminopregnane solution. Alternatively, the nitrimino group can be hydrolyzed by refluxing a solution of the steroid in aqueous dioxane.

The reaction of the 5-fluoro-6-ketopregnane obtained in the second step with sulfur tetrafluoride/hydrogen fluoride or sulfur tetrafluoride/Lewis acid mixture is carried out in an inert solvent of the same type as those used in the first step, i.e., methylene chloride, chloroform, carbon tetrachloride, fluorodichloromethane, ethylene chloride, and the like. Sulfur tetrafluoride can be replaced by selenium tetrafluoride or by an organosulfur fluoride, such as phenylsulfur trifluoride, but sulfur tetrafluoride is the cheapest and the most readily available reagent. Since both sulfur tetrafluoride and hydrogen fluoride are gases at the reaction temperature, it is practical to carry out this step in a closed reactor, such as a shaking autoclave. The reaction is best carried out at moderate temperatures, below about 100° C., and preferably at $-10$ to 30° C. It usually is not practical to lower the temperature below about $-10°$ C. because the reaction rates are too low for an efficient operation.

The relative proportions of sulfur tetrafluoride and of hydrogen fluoride can be varied within a rather broad range; the molar proportion of hydrogen fluoride in admixture with sulfur tetrafluoride can be as low as zero or as high as about 90%, the 15–20% range being preferred. Although other fluoro Lewis acids, such as $BF_3$ and $SbF_5$, can be used, hydrogen fluoride, either added directly or generated in situ is preferred. Hydrogen fluoride can be generated in situ by adding to the reaction mixture a compound containing at least one active hydrogen, such as water or alcohol. Reaction of such an active hydrogen-containing compound with sulfur tetrafluoride liberates hydrogen fluoride. The 5,6,6-trifluoropregnane can be recovered by conventional methods, such as evaporation of solvent and recrystallization of the residue or column chromatography.

The normally acid-sensitive 16α,17α-ketal group is stable to both NOF and SF₄/HF mixtures.

Hydrolysis of the C-3 and C-21 ester groups is readily accomplished by contacting a solution of the steroid in a water-miscible solvent with aqueous alkali, such as sodium or potassium carbonate, or sodium hydroxide. This step is usually carried out at room temperature, but the temperature range of about —10° to 35° C. can conveniently be employed. Suitable solvents include lower alcohols, such as methyl, ethyl, propyl, isopropyl and t-butyl; and water-miscible ethers, such as tetrahydrofuran and dioxane. Methyl alcohol/tetrahydrofuran mixtures preferred because of their good solvent properties towards both the steroid compound and the aqueous alkali.

The 21-hydroxyl is selectively esterified with acetic anhydride in pyridine at a temperature preferably not over 0° C. A temperature range of about —20° C. to —5° C. is particularly suitable. Under these conditions, the reaction usually takes several hours, but the 3-hydroxyl is not affected. The 3-hydroxyl is then oxidized to the 3-keto group in any conventional manner known to the art, e.g., with chromic acid. The preferred reagent is a solution of chromic acid and sulfuric acid in water [L. F. Fieser and M. Fieser, *Reagents for Organic Synthesis*, John Wiley & Sons, p. 142 (1967)]. The 3-hydroxysteroid is dissolved in a water-miscible solvent, such as an ether or a ketone, e.g., dioxane, tetrahydrofuran, acetone, or methyl ethyl ketone. The reaction is carried out at or below room temperature, although a temperature of up to about 35° C. can be used.

Dehydrofluorination of the 5-keto-5,6,6-trifluoropregnane to the Δ⁴-3-keto-6,6-trifluoropregnene ketal is done in the presence of a base, such as alumina, potassium carbonate, silver oxide, potassium hydroxide, and lithium carbonate. Although a non-aqueous medium, such as methanol or ethanol is desirable, the reaction sometimes can be carried out in the presence of water. The dehydrofluorination occasionally requires heating, even to reflux, but usually is accomplished at about room temperature.

These steps of hydrolysis of the 3-alkanoyl group, oxidation of the 3-hydroxy to 3-keto group and dehydrohalogenation of the 5-halocompound are well known in the art. Such reactions are described among others in "Steroids," by Fieser and Fieser, Reinhold Publishing Corp., New York 1959.

Prior to the introduction of the 11β-hydroxyl, the 21-hydroxyl must be regenerated. The acetyl group is hydrolyzed with an aqueous base, such as potassium carbonate in a mixture of methanol, tetrahydrofuran, and water. The product of Step 7 thus is an important intermediate in the preparation of the steroid anti-inflammatory agents by this process.

The last step in Scheme 1, microbiological hydroxylation in the C-11 position, is conveniently carried out in the presence of a suitable microorganism from, for example, the *Curvularia* family, e.g., *Curvularia lunata* or *Curvularia pallescens*.

The final products of the above sequence are potent anti-inflammatory agents which also have glucocorticoid activity. The 11β-hydroxyl can be, if desired, oxidized to the 11-keto group by methods well known to the art. These 11-ketosteroids also are anti-inflammatory and glucocorticoid agents.

A Δ¹-double bond can be introduced into either the 11β-hydroxy- or the 11-ketosteroid. The resulting products often have enhanced biological activities. The introduction of the double bond can also be done microbiologically, for example, with the microorganism *Arthrobacter simplex*.

The class of compounds which can thus be prepared by these methods can be represented by the general Formula (1) below:

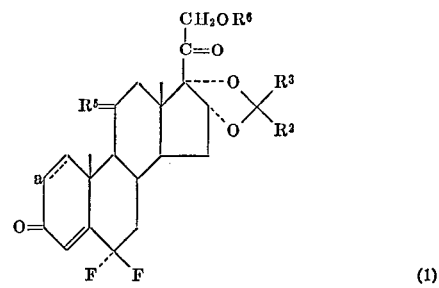

(1)

in which $R^6$ is hydrogen or

the meaning of $R^2$, $R^3$ and $R^4$ is the same as in Scheme 1; and $R^5$ is one oxygen or one α-hydrogen and one β-hydroxyl.

These compounds are useful in the treatment of allergic, collagen, skin and musculoskeletal diseases. They can be administered orally, parenterally or topically with dosage rates generally in the range of 0.0001 to 1 mg. per kg. of body weight per day.

New intermediates, which are obtained at various stages of the above process can be represented by the following Formula (2):

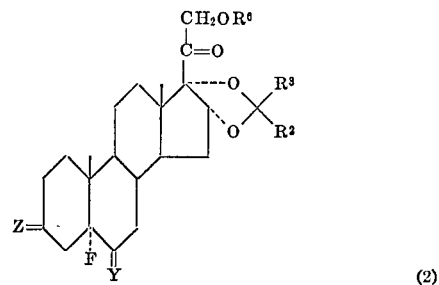

(2)

in which Z is oxygen or one α-hydrogen and one β-OR⁷, R⁷ being hydrogen or the

group; Y is the nitrimino group, oxygen, or two fluorine atoms; and the meaning of $R^1$, $R^2$, $R^3$, and $R^6$ is the same as above.

A further class of new intermediates are represented by Formula (2b)

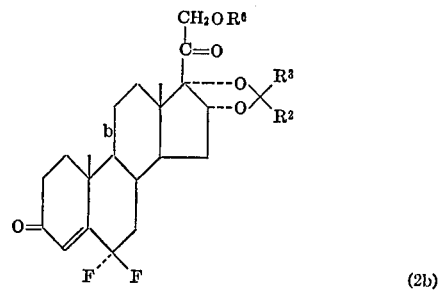

(2b)

in which b is a double bond or β-epoxy between carbons 9 and 11 and the R groups are as stated above.

Some of these novel steroid compounds are biologically active as progestational, anti-estrogen and anti-androgen agents.

The invention is now illustrated by the following Examples showing some possible reaction sequences.

All temperatures are reported in degrees centigrade. The symbol Ac in formulas stands for the acetyl group, $CH_3$—CO—. Methyl groups in positions 10 and 13 are indicated by vertical lines. The symbol Py stands for pyridine. The abbreviation MeOH designates methyl alcohol, and THF designates tetrahydrofuran.

EXAMPLE 1

6,6-Difluoro-16α,17α,21-trihydroxy-4-pregnen-3,20 - dione 16,17-acetonide (11) and 6,6,9α-trifluoro-21-chloro-11β,16α,17α-trihydroxyl-1,4-pregnadien-3,20 - dione 16, 17-acetonide (20)

(A) 3β,16α,17α,21-Tetrahydroxy-5-pregnen-20-one 16, 17-acetonide [obtained by the procedure of Crabbe et al., Bull. Societes Chimiques Belges, 70, 271–284 (1961)], which is an intermediate in the commercial synthesis of fluocinolone acetonide (6α,9α - difluoro - 11β,16α,17α,21-tetrahydroxy-1,4-pregnadiene-3,20-dione 16,17-acetonide), was acetylated in the C-3 and C-21 positions with acetic anhydride in the presence of pyridine. The product (3), obtained in a 97.5% yield, had a m.p. of 173–175°.

(B) 5α - Fluoro - 3β,16α,21 - tetrahydroxypregna - 6,20-dione 16,17-acetonide 3,21-diacetate (5):

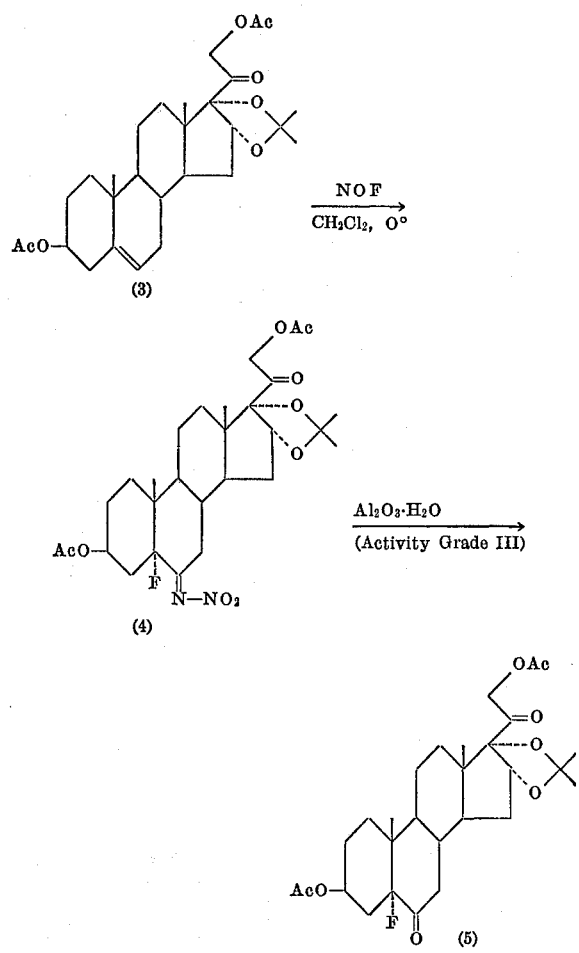

A mixture of 3β, 16α,17α,21-tetrahydroxy-5-pregnen-20-one 3,21-diacetate 16,17-acetonide (20.78 g.), sodium fluoride (7.3 g.), and 100 ml. of methylene chloride, cooled in an ice-bath, was treated with 7 g. of nitrosyl fluoride over a period of 3 hrs. The reaction mixture was then poured into water. The methylene chloride layer was separated and washed with equal volumes of a saturated sodium bicarbonate solution, water, and saturated sodium chloride; dried ($MgSO_4$), and evaporated to give a bluish oil (4).

IR: $\lambda_{max}^{neat}$ 5.70 and 5.80μ ($C_{20}$ and acetate C=O's), 5.85μ ($C_6$=N—), 6.20 and 7.69μ (—$NO_2$), 8.60μ (C—F).

NMR $H^1$: H-18 (0.75 p.p.m.), H-19 (1.33 p.p.m.) 16,17-acetonide methyls (1.25 and 1.53 p.p.m.), C–3 acetate methyl (1.97 p.p.m.) C-21 acetate methyl (2.03 p.p.m.), H-21 (multiplet at 5.0 p.p.m.).

Chromatography on Activity Grade III alumina and elution with hexane and benzene hexane mixtures gave, with 1:1 benzene-hexane, 7.26 g. (32.5%) of material (pure by T.L.C. using silica gel G and 15% ethyl acetate chloroform), m.p. 225–228° (from acetone-hexane). A small portion of the material was sublimed to provide an analytical sample of compound (5).

Anal.—Calcd. for $C_{28}H_{40}O_8F$: C, 64.52; H, 7.70; F, 3.63. Found: C, 64.75; H, 7.77; F, 4.79.

$[\alpha]_D^{24°}$ +23 (c. 1.53 $CHCl_3$).

Infrared: $\lambda_{max}^{KBr}$ 5.75, 5.80μ (acetate $C_{20}$, and $C_6$ C=O's), 8.15μ (acetate C—O—C), 8.65μ ($C_5$—F).

NMR $H^1$: H-18 (0.63 p.p.m.), H-19 (0.83 p.p.m.), 16,17-acetonide methyls (1.25 and 1.51 p.p.m.), C–3 acetate methyl (2.02 p.p.m.), C–21 acetate methyl (2.17 p.p.m.), H-21 (multiplet at 4.95 p.p.m.).

NMR $F^{19}$: F–5 (doublet at +8181, 9002 c.p.s).

(C) 5α,6,6 - Trifluoro - 3β,16α,17α,21 - tetrahydroxypregna-20-one 16,17-acetonide 3,21-diacetate (6):

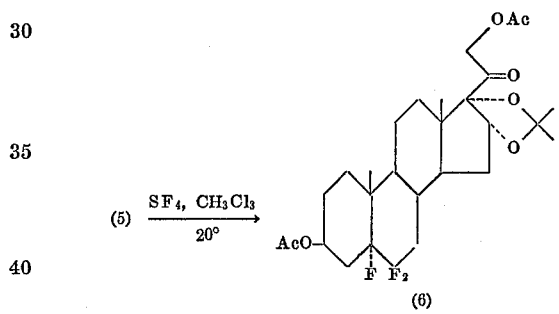

A solution of 2.00 g. of 5α-fluoro-3β,16α,17α-21-tetrahydroxy-pregnan-6,20-dione 3,21-diacetate 16,17-acetonide (5), 1.40 ml. of water, 7.0 ml. of tetrahydrofuran, 92 g. of sulfur tetrafluoride and 20 ml. of methylene chloride was shaken for 10 hrs. at 20+2° in a sealed reactor. The reaction mixture was poured into water. Additional methylene chloride was added and the methylene chloride layer separated and washed with saturated sodium bicarbonate, water, an saturated sodium chloride; dried ($MgSO_4$), and concentrated to give a colorless semi-solid mass. This material was chromatographed on 100 g. of Florisil® and eluted with hexane and acetone-hexane mixtures. Pure product (1.035 g.) was obtained with 3 to 3.5% acetone-hexane. Recrystallization from acetone-hexane yielded 0.829 g. of white needle clusters, m.p. 206–209° (the material was pure by T.L.C. using silica gel G plates and 15% ethyl acetate/chloroform). A second run gave material with m.p. 212–214°.

Anal.—Calcd. for $C_{28}H_{39}O_7F_3$: C, 61.75; H, 7.22; F, 10.48. Found: C, 62.08, 61.99; H, 7.43, 7.20; F, 11.48.

$[\alpha]_D^{24}$ +30° (c 1.27 $CHCl_3$).

Infrared: $\lambda_{max}^{KBr}$ 5.75μ ($C_{20}$ and acetate C=O's), 8.15μ (acetate C—O—C), 8. 50, 8.65, 8.85μ (C—F).

NMR $H^1$: H-18 (0.67 p.p.m.), H-19 (triplet at 1.08 p.p.m., J ~3 cp.s.), 16,17-acetonide methyls (1.27 and 1.51 p.p.m.), C–3 acetate methyl (2.05 p.p.m.), C–21 acetate methyl (2.18 p.p.m.), H-21 (multiplet at 5.0 p.p.m.).

NMR $F^{19}$: F–5 (doublet at +9471 and 9513 c.p.s.), F–6α and F–6β (multiplet at +6024, 6035 and 6046).

This compound exhibited weak corticoid activity.

(D) 5α,6,6 - Trifluoro - 3β,16α,17α,21 - tetrahydroxy-pregnan-20-one 16,17-acetonide (7):

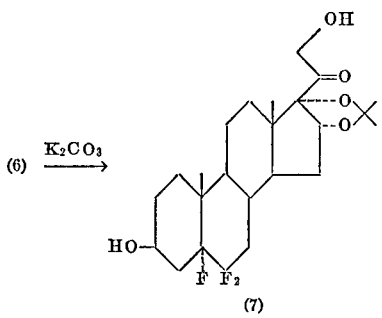

To a solution of 1.00 g. of 3β,16α,17α,21-tetrahydroxy-5α,6,6-trifluoropregnan-20-one 3,21-diacetate 16,17-acetonide (6) in 100 ml. of deaerated methanol and 20 ml. of deaerated tetrahydrofuran was added 0.530 g. of potassium carbonate dissolved in 14 ml. of deaerated water. The resulting clear solution was stirred, under nitrogen, overnight at room temperature. The reaction mixture was then carefully diluted with ca. one liter of water, and the white solid was collected and dried in a vacuum oven to give 0.610 g. of (7) (72.5%). The NMR spectrum indicated that no acetate groupings were present and the ketal group had remained intact. The aqueous filtrate from above was extracted with methylene chloride to give an additional 68 mg. of a clear oil.

Infrared: $\lambda_{max.}^{Nujol}$ 275μ (O—H), 5.80μ ($C_{20}$=O), 8.50, 8.65, 8.85μ (C—F).

NMR $H^1$: H-18 (0.57 p.p.m.), H-19 (triplet at 1.05 p.p.m., J ~2 c.p.s.), 16, 17-acetonide methyls (1.15 and 1.47 p.p.m.), H-21 (AB quartet at 3.97, 4.30, 4.58 and 4.92 p.p.m.), H-16 and H-3 (multiplet at 5.07 p.p.m.

NMR $F^{19}$: F-5 (doublet at +9425 c.p.s.), F-6α and F-6β (multiplet at +6025 c.p.s.).

(E) Acetylation of (7):

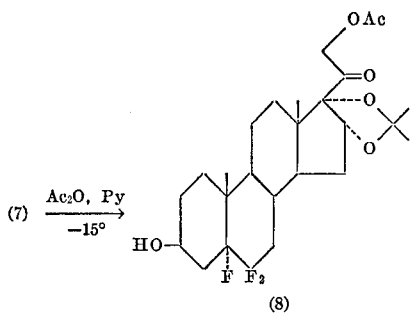

To a solution of 411 mg. (0.817 mole) of 3β,16α,17α,21-tetrahydroxy-5α,6,6-trifluoropregnan - 20 - none 16,17-acetonide in 5 ml. of dry pyridine cooled to 0° was added 94.3 mg. (0.923 mmole) of freshly distilled acetic anhydride. The solution was then allowed to stand at —10° to —15° for 24 hours. It was then poured into ice-water. An oil separated which was extracted with methylene chloride (3× 50 ml.). The methylene chloride layer was washed with water (10× 100 ml.), saturated sodium chloride, dried ($Na_2SO_4$) and evaporated to give 413 mg. of a clear oil. Chromatography on 20 g. of Florisil® and elution with hexane and acetone-hexane mixtures gave, with 7–10% acetone-hexane, 230 mg. of a clear oil (8), which was identified as 5α,6,6-trifluoro-3β,16α,17α-trihydroxy-21-acetoxypregnan-20-one 16,17-diacetonide.

Infrared: $\lambda_{max.}^{CHCl_3}$ 2.80μ (O—H), 5.74 and 5.79μ (acetate and $C_{20}$=O), 822μ (C—O—C acetate), 8.50 8.65, 8.85μ (C—F).

NMR $H^1$: H-18 (0.67 p.p.m.), H-19 (triplet at 1.07 p.p.m., J ~2.5 c.p.s.) 16,17-acetonide methyls (1.25 and 1.50 p.p.m.), C-21 acetate methyl (2.17 p.p.m), H-21 (multiplet at 4.95 p.p.m.).

(F) 6,6-Difluoro-16α,17α,21 - trihydroxy - 4 - pregnen-3,20-dione 16,17-acetonide 21-acetate (10):

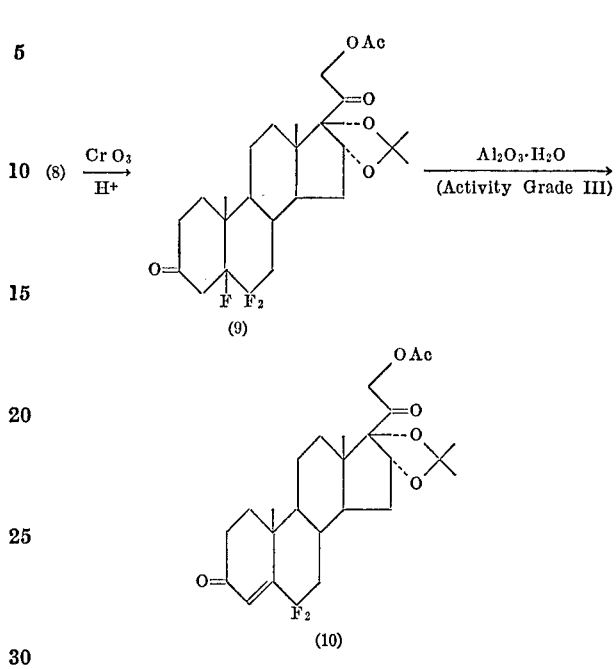

To a solution of 3β,16α,17α,21-tetrahydroxy-5α,6,6-trifluoropregnan-20-one 21-acetate 16,17-acetonide (7) (230 mg.) in 15 ml. of acetone, cooled in an ice-bath, was added 0.15 ml. of Jones reagent (3.90 meq./ml.). The mixture was stirred for 15 min. after the addition was complete. A few drops of methanol were added to decompose excess reagent and the mixture was stirred, in an ice-bath for additional 15 min. The mixture was filtered and the precipitate washed well with acetone. A solution of 0.5 g. of sodium bicarbonate in 20 ml. of water was added. The precipitation of the product was completed by careful dilution with 75 ml. of water to give 187 mg. (81.5%) of a white solid (9).

Infrared: $\lambda_{max.}^{CHCl_3}$ 5.75 and 5.83μ (acetate, $\overset{O}{\overset{\|}{C}}_3$ and $C_{20}$=O), 8.20μ acetate (C—O—C), 8.50, 8.65, 8.85μ (C—F).

The above material (9) was chromatographed on 10 g. of alumina III and eluted with hexane and benzene-hexane mixtures to yield 165 mg. of a crystalline compound, pure by T.L.C. (silica gel G with chloroform). Crystallization from methylene chloride-hexane gave 137 mg. of blunt, white needles of compound (10), m.p. 207–208°.

Anal.—Calcd. for $C_{26}H_{34}O_6F_2$: C, 64.99; H, 7.13; F, 7.92. Found: C, 64.96, 65.22; H, 7.33, 7.42; F, 6.71.

Ultraviolet: $\lambda_{max.}^{EtOH}$ 228 mμ (ε 12,700), 296 mμ (ε 125), 303 mμ (ε 120), 315 mμ (ε 82).

Infrared: $\lambda_{max.}^{KBr}$ 5.80μ ($C_{20}$=O), 5.70 and 8.0μ (21-acetate), 5.95μ ($C_3$=O), 8.55, 8.70, 8.85μ (C—F).

NMR $H^1$: H-18 (0.70 p.p.m.), H-19 (partially obscured multiplet at ca. 1.23 p.p.m.), 16, 17-acetonide methyls (1.22 and 1.45 p.p.m.), C-21 acetate methyl (2.13 p.p.m.), H-21 (multiplet at 4.95 p.p.m.), H-4 (doublet at 6.25 p.p.m., J=4 c.p.s.).

NMR $F^{19}$: F-6α and F-6β (overall AB pattern with downfield lines further split: 4737 and 4772, 4994 and 5025, 5643, 5899 c.p.s.).

This compound has progestational, antiandrogen, and antiestrogen activities.

(G) 6,6-Difluoro-16α,17α,21 - trihydroxy - 4 - pregnen-3,20-dione 16,17-acetonide (11):

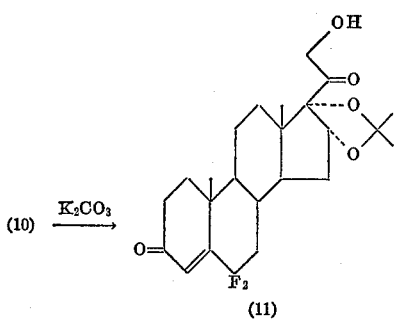

A solution of 1.00 g. of (9), 100 ml. of deaerated methanol, 20 ml. of deaerated tetrahydrofuran, 0.224 g. of anhydrous potassium carbonate and 7 ml. of water was stirred under nitrogen overnight at room temperature. It was then carefully diluted with water and the white, precipitated solid collected and air-dried. It was crystallized from acetone-hexane to give 622 mg., m.p. 280–284 (sealed cap).

*Anal.*—Calcd. for $C_{24}H_{32}O_5F_2$: C, 65.75; H, 7.35; F, 8.67. Found: C, 65.89; H, 7.43; F, 8.71.

Infrared: $\lambda_{max}^{KBr}$ 2.87μ (O—H), 5.84 and 5.91μ (C=O), 8.0μ (C—O—C), 8.5 to 9.0μ (C—F). $[\alpha]_D^{24°} +43°$ (c. 0.76 $CHCl_3$).

The latter compound (11) exhibits weak glucocorticoid activity [see Dorfman, "Methods in Hormone Research," Vol. II, pages 325–367, Academic Press (1962)].

(H) 6,6 - Difluoro - 11β,16α,17α,21 - tetrahydroxy - 4-pregnen-3,20-dione 16,17-acetonide (13): Compounds (10) and 11 were microbiologically hydroxylated in the C-11 position to give 6,6-difluoro-11β,16α,17α,21-tetrahydroxy - 4 - pregnen - 3,20 - dione 16,17 - acetonide 21-acetate and the corresponding 21-hydroxycorticoid, respectively. The latter has antiinflammatory activity. Microbiological hydroxylation can also give 6,6 - difluoro-11β,16α,17α,21-tetrahydroxy - 4 - pregnen-3,20-dione 16,17-acetonide which can be converted to the corresponding 9α-fluoro-11β-hydroxy steroid.

For example, compound (11) underwent biological hydroxylation by the following procedure:

*Curvularia pallescens* was maintained at 23–25° C. for 14 to 16 days on agar slants having the composition

| | |
|---|---|
| Malt extract | g 20 |
| Peptone | g 1 |
| Dextrose | g 20 |
| Agar | g 15 |
| Distilled water | ml 1000 |

A soybean meal-Cerelose medium containing

| | |
|---|---|
| Soybean meal | g 5 |
| Cerelose (dextrose) | g 20 |
| Yeast extract | g 5 |
| Sodium chloride | g 5 |
| Potassium dibasic phosphate | g 5 |
| Distilled water | ml 1000 | was adjusted to pH of 6.5 by addition of hydrochloric acid and the microorganism transferred to it from the agar slants and grown for 28 hrs. in 250 ml. Erlenmeyer flasks each containing 100 ml. of the soybean-Cerelose medium while on a rotary shake,. A flask of the growing culture inoculated 400 ml. of the same medium in a 2 l. flask. The culture was grown for 18 hrs. on a shaker and 2.4 g. of compound (11) dissolved in 60 ml. of dimethylformamide was distributed equally to 30 2-l. flasks and incubation continued for 120 hrs. The combined products were acidified with acetic acid to pH of 4 and extracted successively with 8.5, 4.8 and 1.6 l. of chloroform. The extract was washed with water, dried over anhydrous sodium sulfate and solvent removed by evaporation. The residue was chromatographed on a silica column using benzene/ethyl acetate (70/30) eluant to give about 13% yield of 6,6-difluoro-11β,16α,17α,21-tetrahydroxy-4-pregnen-3,20-dione 16,17-acetonide (12), m.p. 260–264° C.

Microbiological dehydrogenation in the 1,2-position of the resulting steroid was effected by *Arthrobacter simplex* which was maintained on agar slants from 1 g. of yeast extract, 2 g. of agar and 96 ml. of water. The organism was transferred to a nutrient broth (commercially available from Difco). The growth, inoculation, incubation, extraction and isolation were carried out by the general procedures for the 11β-hydroxylation. Chromatography with chloroform/acetone gave 6,6-difluoro-11β,16α,17α, 21 - tetrahydroxy - 1,4 - pregnadien - 3,20 - dione 16,17-acetonide (13), m.p. 258–262.5° C. in 50% yield.

(I) 21 - Chloro - 6,6 - difluoro - 11β,16α,17α-trihydroxy - 1,4 - pregnadien - 3,20 - dione 16,17 - acetonide (14): To a cooled (0°) solution of the preceding steroid (170 mg., 0.376 mmole) in 3 ml. pyridine was added 90.5 mg. (0.795 mmole) of redistilled methanesulfonyl chloride ($CH_3SO_2Cl$). The solution was stirred overnight at 25° then poured into 40 ml. ice-water. The resulting precipitate was collected and air-dried. It was then taken up in methylene chloride (25 ml.) and dried with magnesium sulfate. This solution was added to a boiling mixture of 60 mg. of lithium chloride and 8 ml. of dimethylformamide. The methylene chloride was boiled off during the addition which took 1 hr. The mixture was refluxed an additional 30 min. after the addition was complete. It was then poured into water, and precipitate collected and air-dried. Crystallization from acetone-hexane gave 94 mg., m.p. 285–286° of 21-chloro-6,6-difluoro-11β,16α, 17α-trihydroxy-1,4-pregnadiene-3,20-dione 16,17-acetonide (14).

Mass spectrum: Calcd. for $C_{24}H_{29}O_5F_2Cl$: 470.1672. Found: 470.1648.

UV: $\lambda_{max}^{EtOH}$ 240 mμ (ε 14,200)

(J) 6,6 - Difluoro - 11β,16α,17α,21 - tetrahydroxy - 4-pregnen - 3,20 - dione 21 - acetate 16,17 - acetonide (15): To a cooled solution of 6,6,-difluoro-11β,16α,17α,21-tetrahydroxy-4-pregnen-3,20-dione 16,17-acetonide (0.674 g.) (12) in 4 ml. of pyridine was added 3 ml. of acetic anhydride. Stirred for 16 hrs. then diluted with water and the resulting precipitate was filtered and air-dried. Crystallization from acetone-hexane gave 0.710 g. of 6,6-difluoro-11β,16α,17α,21 - tetrahydroxy - 4 - pregnen - 3,20 - dione 16,17-acetonide 21-acetate (15), m.p. 256–258°.

(K) 6,6 - Difluoro - 16α,17α,21 - trihydroxy - 4,9(11)-pregnadien - 3,20 - dione 21 - acetate 16,17 - acetonide (16): 6,6 - Difluoro - 11β,16α,17α,21 - tetrahydroxy - 4-pregnen - 3,20 - dione 16,17 - acetonide 21 - acetate (15) (2.0 g., 4.02 mmoles) in 5 ml. of pyridine at 25° was treated with 0.640 g. (4.42 mmoles) of N-bromoacetamide. The reaction was stirred for 15 min., then cooled to 10° C. and sulfur dioxide was bubbled in until the reaction mixture was negative to acidified starch-iodide paper. Water (15 ml.) was added, followed by a mixture of 30 ml. conc. hydrochloric acid and 40 g. of ice. The solid was collected, washed with water and air-dried. Chromatography on Florisil, elution with 5% acetone-hexane, gave, after recrystallization from acetone-hexane, 1.46 g. of 6,6-difluoro-16α,17α,21-trihydroxy-4,9(11)-pregnadien-3,20-dione acetate 16,17-acetonide (16).

(L) 6,6 - Difluoro - 9α - bromo - 11β,16α,17α,21-tetrahydroxy - 4 - pregnen - 3,20 - dione 21 - acetate 16,17-acetonide (17): To 1.46 g. (3.05 mmole) of 6,6-difluoro-16α,17α,21-trihydroxy-4,9(11) - pregnadien - 3,20-dione 21-acetate 16,17-acetonide (16) in 50 ml. of acetone at 15° C. was added 0.922 g. (6.7 mmoles) of N-bromoacetamide in 21 ml. of water. A solution of 0.8 N perchloric acid (2.3 ml.) was added slowly. After 15 min. saturated aqueous sodium sulfite was added to discharge the yellow color. The resulting precipitate, after diluting the reaction mixture with water, was filtered, washed with water and air-dried to give 0.8 g. of 6,6-difluoro-9α-bromo-11β,16α,17α 21 - tetrahydroxy-4-pregnen-3,20-dione 21-acetate 16,17-acetonide (17).

(M) 6,6 - Difluoro - 9,11 - epoxy - 16α,17α,21 - trihydroxy - 4 - pregnen - 3,20 - dione 21 - acetate 16,17-acetonide (18): 6,6 - Difluoro - 9α - bromo - 11β,16α,17α, 21 - tetrahydroxy - 4 - pregnen - 3,20 - dione 21-acetate 16,17-acetonide (17) (0.8 g., 1.39 mmoles), 50 ml. of ethanol and 0.768 g. of potassium acetate (7.82 mmoles) were refluxed for 1 hr. Solvent (25 ml.) was allowed to distill then the reaction mixture was cooled, diluted with water and the precipitate collected by filtration, washed with water and air-dried. Chromatography on Florisil and elution with 2% acetone-hexane afforded 0.677 g. of 6,6 - difluoro - 9,11 - epoxy - 16α,17α,21 - trihydroxy-4-pregnen-3,20-dione 21-acetate 16,17-acetonide (18).

(N) 6,6,9α - Trifluoro - 11β,16α,17α,21 tetrahydroxy-4-pregnen - 3,20 - dione 21-acetate 16,17-acetonide (19): 6,6 - Difluoro - 9,11 - epoxy-16α,17α,21-trihydroxy-4-pregnen-3,20-dione 21-acetate 16,17-acetonide (18) (0.677 g.) was added to 20 ml. of hydrofluoric acid-urea complex at 10°. Stirring was continued under nitrogen for 30 min. then the reaction was slowly added to saturated aqueous sodium bicarbonate solution. The resulting solid was collected by filtration, washed with water and air-dried. Chromatography on Florisil and elution with 2 to 5% acetone-hexane gave 0.3 g. of 6,6,9α-trifluoro-11β,16α,11α, 21-tetrahydroxy-4-pregnen-3,20-dione 16,17-acetonide 21-acetate (19), m.p. 284–286°.

(O) 6,6,9α - Trifluoro - 11β,16α,17α,21 - tetrahydroxy-1,4 - pregnadien - 3,20 - dione 21-acetate 16,17-acetonide (20): A mixture of 6,6,9α-trifluoro-11β,16α,17α,21-tetrahydroxy-4-pregnen-3,20-dione 16,17-acetonide 21-acetate (254 mg.) (19), 110 mg. dichlorodicyanoquinone, 119 mg. benzoic acid, and 15 ml. of chlorobenzene was refluxed under nitrogen for 24 hrs. An additional 110 mg. of dichlorodicyanoquinone was added and refluxing continued for 8 hrs. The mixture was then filtered and diluted with benzene. The organic portion was washed with saturated aqueous sodium bicarbonate, water and brine. It was dried with anhydrous magnesium sulfate and the solvent evaporated to give 144 mg. (20) which was recrystallized from methanol-methylene chloride, m.p. 284–286°.

(P) 21 - Chloro - 6,6,9α - trifluoro - 11β,16α,17α-trihydroxy-1,4-pregnadien-3,20-dione 16,17-acetonide (22): The 21-acetate (20) was hydrolyzed with potassium carbonate and water in tetrahydrofuran-methanol solution. The crude 6,6,9α-trifluoro-11β,16α,17α,21-tetrahydroxy-1,4-pregnadien-3,20-dione 16,17-acetonide (100 mg.) (21) in 3 ml. of pyridine at 0° was treated with 34 μl. of methane-sulfonyl chloride. The solution was allowed to warm to 25° and was stirred for 24 hrs. It was then poured into water and the resulting precipitate filtered. This solid was taken up in 15 ml. of methylene chloride, dried (anhydrous magnesium sulfate), and the solution was then slowly added to a refluxing mixture of 70 mg. of lithium chloride in 6 ml. of dimethylformamide. The reaction was refluxed for 1 hr. after the addition was complete and then allowed to stand at 25° for 24 hrs. It was poured into ice-water and the precipitate filtered. Crystallization from acetone-hexane gave 60 mg., m.p. 285–287°, of 6,6,9α-trifluoro - 21 - chloro - 11β,16α,17α - trihydroxy-1,4-pregnadiene-3,20-dione 16,17-acetonide (22).

Mass spectrum: Calcd. for $C_{24}H_{28}O_5F_3Cl$: 488.1576. Measured: 488.1582.

UV: $\lambda_{max.}^{EtOH}$ 234 mμ (ε, 16,100); 297 mμ (K 0.49).

EXAMPLE 2

6,6 - Difluoro - 11β,16α,17α,21 - tetrahydroxy-1,4-pregnadien-3,20-dione 16,17-acetonide 21-acetate (23)

When 6,6-difluoro-11β,16α,17α,21-tetrahydroxy-4-pregnen-3,20-dione 16,17-acetonide 21-acetate (for preparation see (H) of Example 1) was reacted with dichlorodicyanoquinone according to the general procedure of Example 1, part (O), there was obtained 6,6-difluoro-11β,16α,17α,21-tetrahydroxy - 1,4 - pregnadien-3,20-dione 16,17-acetonide 21-acetate (23), m.p. 251–253°.

Mass spectrum: Calcd. for $C_{26}H_{32}F_2O_7$: 494.2116. Found: 494.2131.

UV: $\lambda_{max.}^{EtOH}$ 238 mμ (ε, 14,000); 297 mμ (ε, 1,150).

EXAMPLE 3

21 - Chloro - 6,6 - difluoro-11β,16α,17α-trihydroxy-4-pregnen-3,20-dione 16,17-acetonide (24)

When 6,6-difluoro-11β,16α,17α,21-tetrahydroxy-4-pregnen-3,20-dione 16,17-acetonide (see 12 of part (H) of Example 1) is treated in the manner described in Example 1(I) or 1(P), the corresponding 21-chloro-6,6-difluoro-11β,16α,17α - trihydroxy-4-pregnen-3,20-dione 16,17-acetonide (24) is obtained, m.p. 225–230°.

These corticoids possess good to excellent topical anti-inflammatory activity as shown by the following procedure:

Topical anti-inflammatory assay (rat ear assay): Intact male 21-day-old rats (60–70 g.) were anesthetized and the test compound in vehicle (20% pyridine, 5% distilled water, 74% diethyl ether, and 1% croton oil by volume) was applied to the left ear, 0.05 ml. to the inside of the ear and 0.05 ml. to the outside. One group of 9 rats received vehicle only, 3 groups (6–7 rats per group) received 3X dose increments of compound in vehicle, and 3 groups (6–7 rats per group) received 3X dose increments of fluocinolone acetonide, or 4X increments of hydrocortisone, the test standards, in vehicle. Six hours later, the rats were sacrificed and ear pieces of uniform size were punched out with a No. 4 cork borer. The ear pieces were weighed, and the mean weights for the control- and test substance-treated groups were calculated. Plots of percent decrease from control versus log dose were made, and the doses of compound and of test standard (in mg. per kg. of body weight) which caused a 30% reduction from control ear piecss weight were determined from dose-response lines fitted visually. ED 30% values were compared to give potency ratios of compounds with respect to fluocinolone acetonide.

TABLE OF TOPICAL ANTIINFLAMMATORY ACTIVITY

| | ED 30% reduction (mg./kg.) | | Potency ratio of test compound to fluocinolone acetonide |
|---|---|---|---|
| | Fluocinolone acetonide | Test compound | |
| Compound number: | | | |
| 20 | 0.0047 | 0.013 | 0.34 |
| 12 | 0.0059 | 0.022 | 0.24 |
| 15 | 0.012 | >0.46 | <0.026 |
| 23 | 0.0046 | 0.0086 | 0.53 |
| 13 | 0.0069 | 0.012 | 0.58 |
| 24 | 0.0071 | 0.028 | 0.24 |
| 14 | <0.0046 | 0.0079 | <0.60 |
| 22 | 0.010 | 0.015 | 0.79 |

When the above procedure was used except that hydrocortisone was employed as the standard in place of fluocinolone acetonide, the following results were obtained.

| | ED 30% reduction (mg./kg.) | | Potency ratio of test compound to hydrocortisone |
|---|---|---|---|
| | Hydrocortisone | Test compound | |
| Compound number: | | | |
| 19 | 0.35 | 0.0060 | 59 |
| 20 | 0.43 | 0.0095 | 46 |
| 5 | 0.69 | <0.77 | <0.90 |
| 6 | 0.69 | 1.7 | 0.41 |

Further pharmacological activity was also shown by the following test:

Human vasoconstrictor (Stoughton-McKenzie) assay.—The method of Place et al., Arch. Derm. (Chicago), 101, 531-7 (1970) was used. The corticosteroids were dissolved in 100 ml. of methanol at a standard concentration of 0.5 or 0.05 mg. per ml., depending on their alcohol solubility. Aliquots of 5 ml. were then pipetted into identical vials and evaporated under nitrogen. Several vials were utilized to assay recovery from the desiccated vials, to test for solubility in 95% ethanol and to serve as retention samples for stability and identity. Preparation of a large number of vials in this manner resulted in identically prepared samples which permitted replicate assays.

Each coded vial of crystalline corticosteroid was sufficient for one test assay. Ten-fold serial dilutions from $1\times10^{-3}$ (0.1%) to $1\times10^{-8}$ (0.000001%) in ethanol were prepared. These were used within a week. Adult white subjects were utilized. Each subject received all of the serial dilutions randomly on one arm. Duplicate applications, differently randomized on the opposite arm, provided a check on the assay. The number of sites in each study equaled the number of preparations to be tested so that every test site received every preparation.

The skin of the forearm was prepared by washing with soap and water. The test sites were outlined by a thin film of silicone grease applied by using a rubber stamp. There were 3 or 4 horizontal and 6 or 8 vertical rows giving 18 to 32 uniform 7 x 7 mm. squares.

The square pattern reduced the problem of recognition of test sites. The grid pattern was marked with gentian violet to assist in individual site identification.

Rapid, accurate application without cross contamination of glassware was accomplished by using an individual disposable 10-lambda pipette for each application. After evaporation of the diluent the area was covered with Saran® Wrap and protected by tubular gauze. After 16 to 18 hours of occlusion, the dressings were removed and one to two hours later the sites were viewed. Two investigators read and recorded the presence or absence of vasoconstriction at each test site.

$ED_{50}$ values (the dose of compound in $\mu g./cm.^2$ which produced 50% response) were obtained from log-probit plots of dose versus percent blanching responses and given below.

Table of Activity in the Human Vasoconstrictor (Stoughton-McKenzie) Assay

|  | $ED_{50}$ ($\mu g./cm.^2$) | Potency ratio (fluocinolone acetonide = 1.00) |
|---|---|---|
| Fluocinolone acetonide | 0.046 | 1.00 |
| Compound number: |  |  |
| 19 | 0.39 | 0.12 |
| 12 | 0.27 | 0.17 |
| 15 | 0.36 | 0.13 |
| 23 | 0.19 | 0.24 |
| 13 | 0.095 | 0.48 |
| 14 | 0.020 | 2.30 |
| 22 | 0.016 | 2.88 |

The embodiments of the invention in which an exclusive property or privilege is claimed are defined as follows:

1. A process for the preparation of a $\Delta^4$-3,20-diketo-6,6-difluoro-16α,17α,21-trihydroxypregnene 16,17-ketal having the general formula:

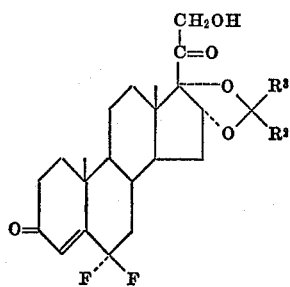

in which $R^2$ and $R^3$ each individually is $C_1$-$C_6$ alkyl, $C_5$-$C_6$ cycloalkyl, or phenyl; but $R^2$ and $R^3$ together can be tetramethylene or pentamethylene; said process consisting essentially of the following sequential steps:

(a) contacting a steroid compound of the formula

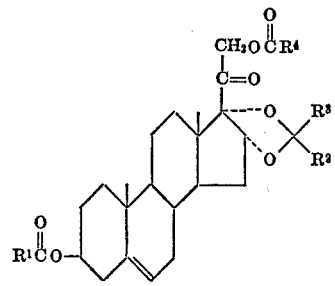

in which the meaning of $R^2$ and $R^3$ is the same as above, and $R^1$ and $R^4$ each individually is a $C_1$-$C_5$ alkyl, with NOF or NOF-NOBF$_4$ mixture in an inert solvent at a temperature of −10 to 100° C., under substantially anhydrous conditions, the amount of nitrosyl fluoride being at least about 2 moles per mole of the starting $\Delta^5$-steroid, and the molar ratio of NOF to NOBF$_4$ being about 50:1 to 1:50, thus producing the corresponding 5α-fluoro-6-nitriminosteroid;

(b) contacting the solution of step (a), above, with a weak base to remove excess reagent and acidic reaction side products, and contacting the solution with neutral alumina containing 5-15 weight percent of water to produce the corresponding 5α-fluoro-6-ketosteroid;

(c) contacting the product of step (b), above, with a fluorinating agent selected from sulfur tetrafluoride, selenium tetrafluoride, and phenylsulfur trifluoride in the presence of a Lewis acid selected from HF, BF$_3$, and SbF$_5$ at a temperature of −10 to 100° C. in an inert solvent, and under substantially anhydrous conditions; with the proviso that when sulfur tetrafluoride and HF are used, the molar proportion of HF in the mixture does not exceed about 90%; thus producing the corresponding 5α,6,6-trifluorosteroid;

(d) contacting the product of step (c), above, dissolved in a water-miscible solvent with aqueous alkali at −10 to 35° C. to remove the C-3 and C-21 acyl groups;

(e) selectively acetylating the 21-hydroxyl by contacting the product of step (d), above, with a solution of acetic anhydride in pyridine at a temperature not exceeding about 0° C.;

(f) oxidizing the 3-hydroxyl to the 3-ketone by contacting the product of step (e), above, in a water-miscible solvent solution with aqueous chromic acid at a temperature not exceeding about 35° C.;

(g) dehydrofluorinating the product of step (f), above, in C-4 to C-5 positions by contacting it with a base selected from anhydrous neutral alumina, potassium carbonate, silver oxide, potassium hydroxide, and lithium carbonate in a solvent selected from methanol and ethanol at up to about reflux temperature of the solvent; and (h) hydrolyzing the 21-acetyl group by contacting the product of step (g) with an aqueous base.

2. The process of Claim 1 in which the maximum temperature in step (a), above, is about 30° C., and an about equimolar mixture of NOF with NOBF$_4$ is used; the maximum temperature in step (c), above, is about 30° C., and a mixture of SF$_4$ with HF is used; and the dehydrofluorinating agent in step (g), above, is anhydrous neutral alumina.

3. A steroid compound of the formula

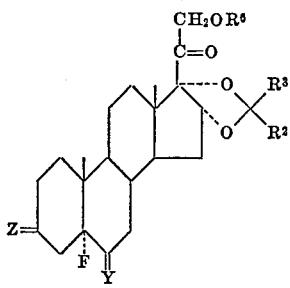

in which $R^2$ and $R^3$ each individually is a $C_1$–$C_6$ alkyl, a $C_5$–$C_6$ cycloalkyl, or phenyl; but $R^2$ and $R^3$ together can be tetramethylene or pentamethylene; Z is oxygen or one α-hydrogen and one β-$OR^7$, $R^7$ being hydrogen or the

group, $R^1$ being a $C_1$–$C_5$ alkyl; Y is the nitrimino group, oxygen, or two fluorine atoms; and $R^6$ is hydrogen or

$R^4$ being a $C_1$–$C_5$ alkyl.

4. 5α - Fluoro-3β,16α,17α,21-tetrahydroxypregna-6,20-dione 16,17-acetonide 3,21-diacetate, the compound of Claim 3 in which Z is one, one α-hydrogen and one β acetyl; Y is oxygen; each of $R^2$ and $R^3$ is methyl; and $R^6$ is acetyl.

5. 5α,6,6 - Trifluoro - 3β,16α,17α,21 - tetrahydroxypregna-20-one 16,17-acetonide, 3,21-diacetate, the compound of Claim 3 in which Z is one α-hydrogen and one β-acetyl; Y is two fluorine atoms; each of $R^2$ and $R^3$ is methyl; and $R^6$ is acetyl.

6. 5α,6,6 - Trifluoro - 3β,16α,17α,21 - tetrahydroxypregnan-20-one 16,17-acetonide, the compound of Claim 3 in which Z is one α-hydrogen and one β-hydroxyl; Y is two fluorine atoms; each of $R^2$ and $R^3$ is methyl; and $R^6$ is hydrogen.

7. 5α,6,6 - Trifluoro - 3β,16α,17α,21 - tetrahydroxypregnan - 20 - one, 16,17-acetonide, 21-acetate, the compound of Claim 3 in which Z is one α-hydrogen and one β-hydroxyl; Y is two fluorine atoms; each of $R^2$ and $R^3$ is methyl; and $R^6$ is acetyl.

8. 5α,6,6 - Trifluoro - 16α,17α,21-trihydroxypregnan-3,20-dione 16,17-acetonide, 21-acetate, the compound of Claim 3 in which Z is oxygen; Y is two fluorine atoms; each of $R^2$ and $R^3$ is methyl; and $R^6$ is acetyl.

9. A steroid compound of the formula

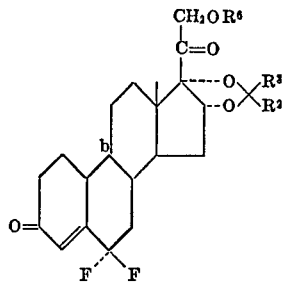

in which $R^2$ and $R^3$ each individually is a $C_1$–$C_6$ alkyl, a $C_5$–$C_6$ cycloalkyl, or phenyl; but $R^2$ and $R^3$ together can be tetramethylene or pentamethylene; $R^6$ is

$R^4$ being a $C_1$–$C_5$ alkyl; and b is a β-epoxy between carbons 9 and 11.

10. 6,6 - Difluoro - 16α,17α,21 - trihydroxy-9β,11β-epoxy-4-pregnan-3,20-dione, 21-acetate 16,17 - acetonide, the compound of claim 9 in which each of $R^2$ and $R^3$ is methyl; $R^6$ is acetyl; and b is an epoxy group.

References Cited
UNITED STATES PATENTS

| | | | |
|---|---|---|---|
| 3,409,613 | 11/1968 | Fried | 260—239.55 |
| 3,629,242 | 12/1971 | Fried | 260—239.55 |
| 3,471,477 | 10/1969 | Fried | 260—239.5 |
| 3,641,005 | 2/1972 | Boswell Jr., et al. | 260—239.55 |

ELBERT L. ROBERTS, Primary Examiner

U.S. Cl. X.R.

424—241